(12) United States Patent
Wang

(10) Patent No.: US 12,355,080 B2
(45) Date of Patent: *Jul. 8, 2025

(54) ELECTROCHEMICAL DEVICE AND ELECTRONIC DEVICE INCLUDING THE SAME

(71) Applicant: NINGDE AMPEREX TECHNOLOGY LIMITED, Ningde (CN)

(72) Inventor: Rui Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 874 days.

This patent is subject to a terminal disclaimer.

(21) Appl. No.: 17/265,710

(22) PCT Filed: Mar. 4, 2020

(86) PCT No.: PCT/CN2020/077771
§ 371 (c)(1),
(2) Date: Feb. 3, 2021

(87) PCT Pub. No.: WO2021/174444
PCT Pub. Date: Sep. 10, 2021

(65) Prior Publication Data
US 2022/0115664 A1    Apr. 14, 2022

(51) Int. Cl.
*H01M 4/62* (2006.01)
*H01M 4/02* (2006.01)
(Continued)

(52) U.S. Cl.
CPC ...... *H01M 4/622* (2013.01); *H01M 2004/021* (2013.01); *H01M 2004/027* (2013.01);
(Continued)

(58) Field of Classification Search
CPC ...... H01M 4/622; H01M 4/133; H01M 4/134; H01M 4/136; H01M 2004/021; H01M 2004/027
See application file for complete search history.

(56) References Cited

U.S. PATENT DOCUMENTS

| 7,638,241 B2 | 12/2009 | Lee et al. |
| 11,955,661 B2 * | 4/2024 | Wang .................... H01M 50/46 |

(Continued)

FOREIGN PATENT DOCUMENTS

| CN | 101326658 B | 9/2010 |
| CN | 104124427 A | 10/2014 |

(Continued)

OTHER PUBLICATIONS

PCT International Search Report mailed Nov. 26, 2020 in counterpart PCT application PCT/2020/077771, 5 pages in Chinese.
(Continued)

*Primary Examiner* — Niki Bakhtiari
*Assistant Examiner* — Niara Trant
(74) *Attorney, Agent, or Firm* — XSENSUS LLP

(57) ABSTRACT

An electrochemical device includes a cathode, an anode, a separator and a binding layer. The separator is disposed between the cathode and the anode, and at least one binding layer is included between the cathode and the anode. The binding layer includes a high molecular polymer. A contact angle of the high molecular polymer to ethylene carbonate is 0° to 90°. By adjusting the contact angle of the high molecular polymer to the ethylene carbonate in the binding layer of the electrochemical device, a binding force of the binding layer can be effectively increased, deformation of the anode or the cathode due to volume swelling during charge and discharge cycles is reduced, and peeling from the separator is avoided.

14 Claims, 1 Drawing Sheet

(51) Int. Cl.
*H01M 4/133* (2010.01)
*H01M 4/134* (2010.01)
*H01M 4/136* (2010.01)

(52) U.S. Cl.
CPC ............ *H01M 4/133* (2013.01); *H01M 4/134* (2013.01); *H01M 4/136* (2013.01)

(56) References Cited

U.S. PATENT DOCUMENTS

| | | | |
|---|---|---|---|
| 2007/0054184 A1* | 3/2007 | Yong | H01M 10/0565 429/339 |
| 2016/0164065 A1 | 6/2016 | Liu et al. | |
| 2016/0293920 A1 | 10/2016 | Jung et al. | |

FOREIGN PATENT DOCUMENTS

| | | | | |
|---|---|---|---|---|
| CN | 104471762 A | 3/2015 | | |
| CN | 105680086 A | 6/2016 | | |
| CN | 108878748 A | 11/2018 | | |
| CN | 109075316 A | 12/2018 | | |
| CN | 110416467 A | 11/2019 | | |
| EP | 3093906 A1 | 11/2016 | | |
| KR | 20170059270 A | 5/2017 | | |
| WO | WO-2005076388 A1 * | 8/2005 | ........... E04G 21/123 | |

OTHER PUBLICATIONS

Supplementary European Search Report mailed Aug. 17, 2022 in counterpart European application EP20922640.6, 3 pages in English.

Chinese Office Action issued Oct. 12, 2023, in corresponding Chinese Application No. 202080004756.7.

* cited by examiner

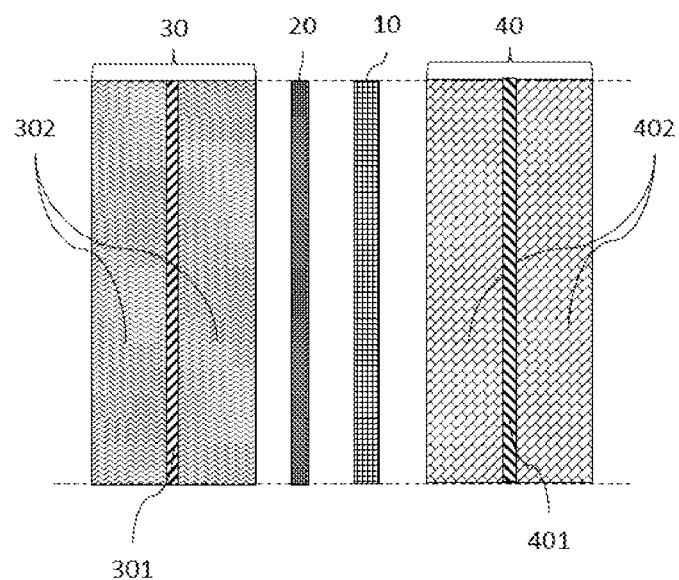

ELECTROCHEMICAL DEVICE AND ELECTRONIC DEVICE INCLUDING THE SAME

CROSS REFERENCE TO RELATED APPLICATIONS

This application is a national stage application filed under 35 U.S.C. § 371, of International Patent Application No. PCT/CN2020/077771, filed on 4 Mar. 2020, which is incorporated by reference herein its entirety.

BACKGROUND

1. Field of the Invention

The present application relates to the technical field of energy storage, and more particularly to an electrochemical device and an electronic device including the electrochemical device.

2. Description of the Related Art

With the rapid development of mobile electronic technology, the frequency and experience requirements of people for mobile electronic devices such as mobile phones, tablet computers, notebook computers, drones, and the like are increasing. Therefore, electrochemical devices (for example, lithium-ion batteries) that provide energy to electronic devices need to exhibit higher energy density, greater rate, higher safety and less capacity attenuation after repeated charge and discharge processes.

The energy density and cycle performance of the electrochemical device are closely related to the cathode active material and the anode active material. In view of this, people continue to do further research and make improvements on anode active materials in order to pursue anode active materials with higher energy density. However, anode active materials with higher energy density (for example, silicon-based materials) often have the problem that they do not match the structure of the existing electrode assembly, for example, too low conductivity, too high thermal swelling rate, insufficient processability and the like. Therefore, for electrochemical devices that use high-energy-density materials as anode active materials, improvement and optimization of their electrode assembly structures (for example, anodes, separators and cathodes) is an urgent research topic at present.

SUMMARY

The present application provides an electrochemical device and an electronic device including the electrochemical device in an attempt to solve at least one problem existing in the related field to at least some extent.

According to one aspect of the present application, the present application provides an electrochemical device, including: a cathode, an anode, a separator and a binding layer, wherein the separator is disposed between the cathode and the anode, and the binding layer is included between the cathode and the anode. In addition, the binding layer includes a high molecular polymer, wherein a contact angle of the high molecular polymer to ethylene carbonate is 0° to 90°.

According to the electrochemical device of the present application, by disposing the binding layer between the cathode and the anode and by controlling the contact angle of the high molecular polymer to the ethylene carbonate in the binding layer, a binding force between elements in the electrochemical device may be enhanced. Thus, after the electrochemical device undergoes multiple charge and discharge cycles, it still maintains good structural stability, and thereby the cycle performance and safety performance of the electrochemical device are enhanced.

According to another aspect of the present application, the present application provides an electronic device, and the electronic device includes the above electrochemical device.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the existing technology so as to facilitate the description of the embodiments of the present application. Obviously, the accompanying drawings described below are only part of the embodiments of the present application. For those skilled in the art, the accompanying drawings of other embodiments may still be obtained according to the structures illustrated in the accompanying drawings without any creative effort.

FIGURE shows a schematic structure view of an electrode assembly of an electrochemical device according to embodiments of the present application.

DETAILED DESCRIPTION

Embodiments of the present application will be described in detail below. Throughout the specification, the same or similar components and components having the same or similar functions are denoted by similar reference numerals. The embodiments described herein with respect to the accompanying drawings are illustrative and graphical, and are used for providing a basic understanding on the present application. The embodiments of the present application should not be interpreted as limitations to the present application.

In addition, amounts, ratios and other numerical values are sometimes presented herein in range formats. It should be appreciated that such range formats are for convenience and brevity, and should be flexibly understood as including not only values explicitly designated to range limits, but also all individual values or sub-ranges within the ranges, like explicitly specifying each value and sub-range.

In the detailed description and claims, a list of items connected by the terms "at least one of" or other similar terms may mean any combination of the listed items. For example, if items A and B are listed, then the phrase "at least one of A and B" means only A; only B; or A and B. In another example, if items A, B and C are listed, then the phrase "at least one of A, B and C" means only A; only B; only C; A and B (excluding C); A and C (excluding B); B and C (excluding A); or all of A, B and C. The item A may include a single element or multiple elements. The item B may include a single element or multiple elements. The item C may include a single element or multiple elements.

Unless otherwise expressly indicated, the following terms used herein have the meanings indicated below.

The term "$C_x$" refers to having x carbon atoms. For example, $C_1$ to $C_{10}$ alkyl is alkyl having 1 to 10 carbon atoms.

The term "hydrocarbyl" encompasses alkyl, alkenyl, alkynyl, cycloalkyl and aryl. For example, the hydrocarbyl is expected to be a linear hydrocarbon structure having 1 to 20 carbon atoms. The "hydrocarbyl" is also expected to be a branched or cyclic hydrocarbon structure having 3 to 20 carbon atoms. When a hydrocarbyl having a specific carbon number is specified, it is expected to cover all geometric isomers having that carbon number. The hydrocarbyl herein may also be $C_1$ to $C_{15}$ hydrocarbyl, $C_1$ to $C_{10}$ hydrocarbyl, $C_1$ to $C_5$ hydrocarbyl, $C_5$ to $C_{20}$ hydrocarbyl, $C_5$ to $C_{15}$ hydrocarbyl or $C_5$ to $C_{10}$ hydrocarbyl. In addition, the hydrocarbyl may be optionally substituted. For example, the hydrocarbyl may be substituted with halogen including fluorine, chlorine, bromine and iodine, alkyl, aryl or heteroaryl.

The term "hydroxyl" refers to a —OH group.

The term "amino" refers to a base composed of one nitrogen atom and two hydrogen atoms, namely a —$NH_2$ group.

The term "carboxyl" is a functional group of carboxylic acid, namely a —C(O)—OH group.

The term "hydrocarbyloxy" refers to an L-O-group, wherein L is alkyl, alkenyl, alkynyl, cycloalkyl or aryl. For example, when the L group is alkyl, the "hydrocarbyloxy" may be referred to as "alkoxy"; and when the L group is methyl, the "hydrocarbyloxy" may be referred to as "methoxy". The hydrocarbyloxy herein may be $C_1$ to $C_{20}$ hydrocarbyloxy, and may also be $C_1$ to $C_{15}$ hydrocarbyloxy, $C_1$ to $C_{10}$ hydrocarbyloxy, $C_1$ to $C_5$ hydrocarbyloxy, $C_5$ to $C_{20}$ hydrocarbyloxy group, $C_5$ to $C_{15}$ hydrocarbyloxy or $C_5$ to $C_{10}$ hydrocarbyloxy.

The term "ester group" is a functional group of an ester in a carboxylic acid derivative, namely a —C(O)—O—R group, wherein R covers alkyl, alkenyl, alkynyl, cycloalkyl and aryl. For example, the ester group is expected to be a linear, branched or cyclic structure having 1 to 200 carbon atoms. The "ester group" is also expected to be a $C_2$ to $C_{10}$ ester group. When an ester group having a specific carbon number is specified, it is expected to cover all geometric isomers having that carbon number. The hydrocarbyl herein may also be a $C_1$ to $C_{15}$ ester group, a $C_1$ to $C_{10}$ ester group, a $C_1$ to $C_5$ ester group, a $C_5$ to $C_{20}$ ester group, a $C_5$ to $C_{15}$ ester group or a $C_5$ to $C_{10}$ ester group.

The term "alkyl" is expected to be a linear chain saturated hydrocarbon structure having 1 to 20 carbon atoms. The "alkyl" is also expected to be a branched or cyclic hydrocarbon structure having 3 to 20 carbon atoms. For example, the alkyl may be $C_1$ to $C_{20}$ alkyl, $C_1$ to $C_{10}$ alkyl, $C_1$ to $C_5$ alkyl, $C_5$ to $C_{20}$ alkyl, $C_5$ to $C_{15}$ alkyl or $C_5$ to $C_{10}$ alkyl. When an alkyl having a specific carbon number is specified, it is expected to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like. In addition, the alkyl may be optionally substituted.

The term "alkenyl" refers to a monovalent unsaturated hydrocarbon group which may be linear or branched and has at least one and usually 1, 2 or 3 carbon-carbon double bonds. Unless otherwise defined, the alkenyl usually contains 2-20 carbon atoms and may be, for example, $C_2$ to $C_{20}$ alkenyl, $C_6$ to $C_{20}$ alkenyl, $C_2$ to $C_{12}$ alkenyl or $C_2$ to $C_6$ alkenyl. Representative alkenyl includes (for example) ethenyl, n-propenyl, isopropenyl, n-but-2-enyl, but-3-enyl, n-hex-3-enyl and the like. In addition, the alkenyl may be optionally substituted.

The term "alkynyl" refers to a monovalent unsaturated hydrocarbon group which may be linear or branched and has at least one and usually 1, 2 or 3 carbon-carbon triple bonds. Unless otherwise defined, the alkynyl usually contains 2 to 20 carbon atoms and may be, for example, $C_2$ to $C_{20}$ alkynyl, $C_6$ to $C_{20}$ alkynyl, $C_2$ to $C_{10}$ alkynyl or $C_2$ to $C_6$ alkynyl. Representative alkynyl includes (for example) ethynyl, prop-2-ynyl(n-propynyl), n-but-2-ynyl, n-hex-3-ynyl and the like. In addition, the alkynyl may be optionally substituted.

The term "acyl" refers to the remaining atomic group after removing hydroxyl (—OH group) from an organic or inorganic oxyacid, namely an R-M(O)-group, wherein M is carbon atom, and R is alkyl, alkenyl, alkynyl, cycloalkyl, aryl or other common substituents. For example, when R is amino, the "acyl" is "amido".

The term "aryl" encompasses both monocyclic system and polycyclic system. A polycyclic ring may have two or more rings in which two carbons are shared by two adjacent rings (the rings are "fused"), wherein at least one of the rings is aromatic and other rings may be for example, cycloalkyl, cycloalkenyl, aryl, heterocyclyl and/or heteroaryl. For example, the aryl may be $C_6$ to $C_{50}$ aryl, $C_6$ to $C_{40}$ aryl, $C_6$ to $C_{30}$ aryl, $C_6$ to $C_{20}$ aryl or $C_6$ to $C_{10}$ aryl. Representative aryl includes (for example) phenyl, methylphenyl, propylphenyl, isopropylphenyl, benzyl, naphthalen-1-yl, naphthalen-2-yl and the like. In addition, the aryl may be optionally substituted.

The term "heterocyclyl" covers aromatic and non-aromatic cyclic groups. The heteroaromatic cyclic group also refers to heteroaryl. In some embodiments, the heteroaromatic cyclic group and the hetero-non-aromatic cyclic group are $C_1$ to $C_{50}$ heterocyclyl, $C_1$ to $C_{40}$ heterocyclyl, $C_1$ to $C_{30}$ heterocyclyl, $C_1$ to $C_{20}$ heterocyclyl, $C_1$ to $C_{10}$ heterocyclyl or $C_1$ to $C_6$ heterocyclyl including at least one heteroatom. Representative heterocyclyl includes (for example) morpholinyl, piperidinyl, pyrrolidinyl and the like, and cyclic ethers, for example, tetrahydrofuran, tetrahydropyran and the like. In addition, the heterocyclyl may be optionally substituted.

As used herein, the term "heteroaryl" covers a monocyclic heteroaromatic group which may include one to three heteroatoms, such as pyrrole, furan, thiophene, imidazole, oxazole, thiazole, triazole, pyrazole, pyridine, pyrazine, pyrimidine and the like. The term heteroaryl further includes a polycyclic heteroaromatic system having two or more rings in which two atoms are shared by two adjacent rings (the rings are "fused"), wherein at least one of the rings is heteroaryl, and other rings may be cycloalkyl, cycloalkenyl, aryl, heterocyclyl and/or heteroaryl. For example, the heteroaryl may be $C_6$ to $C_{50}$ heteroaryl, $C_6$ to $C_{40}$ heteroaryl, $C_6$ to $C_{30}$ heteroaryl, $C_6$ to $C_{20}$ heteroaryl or $C_6$ to $C_{10}$ heteroaryl. In addition, the heteroaryl may be optionally substituted.

As used herein, the term "halogen" may be F, Cl, Br or I.

As used herein, the term "cyano" covers —CN-containing organic functional groups.

The term "degree of substitution" herein refers to the average number of substitutions by substituent groups per monomeric unit on the main chain of a high molecular polymer. For example, a degree of substitution of 0.5 means that there is an average of 0.5 substituent functional group per monomeric unit of a high molecular polymer.

In the field of electrochemical devices, in order to pursue higher energy density, attempts have been made to replace graphite in traditional anode active materials with anode active materials with higher energy density than graphite. However, when such anode active materials with higher energy density than graphite are used, an electrode assembly will be deformed due to larger volume swelling during charge and discharge cycles, which will easily cause damage to the structure of the electrochemical device and reduce service life of the electrochemical device. Especially for lithium-ion batteries, such anode active materials with higher energy density than graphite have a huge volume effect (>300%) during lithium deintercalation, and severe swelling of an anode will cause deformation and even separation of an interface between the anode and/or cathode and a separator, and thereby causing reduction in cycle performance of the lithium-ion battery.

From the perspective of improving electrode swelling, the present application studies to suppress cycle swelling of the anode or cathode during charging by increasing an interface binding force of the separator to the anode or cathode. In the present application, by disposing at least one binding layer between the anode and the cathode and controlling a permittivity of a high molecular polymer in the binding layer or a range of its contact angle to ethylene carbonate, a binding property of the high molecular polymer and a wetting capacity to an electrolytic solution are respectively enhanced, and thereby effectively enhancing the binding force of the binding layer and improving a volume swelling rate of the anode or cathode during charge and discharge cycles, which is beneficial to reducing a deformation degree of the electrode assembly. The binding layer may be used in an electrochemical device using an anode active material with high energy density. The anode active material with high energy density includes, but is not limited to, one or more of simple substances, alloys or compounds of silicon, tin, germanium, antimony, bismuth and aluminum. At the same time, since the swelling and deformation are suppressed, the interface between the anode and/or cathode and the separator is more stable, and thereby improving a cycle capacity retention rate.

According to one aspect of the present application, embodiments of the present application provide a binding layer disposed between a cathode and an anode and adjust functional groups of a high molecular polymer in the binding layer. Electronegativity of different molecular functional groups may be macroscopically expressed as a permittivity of the material itself. Therefore, by controlling the permittivity of the high molecular polymer in the binding layer, high binding force may be achieved to ensure cycle performance and safety performance of its electrochemical device.

FIGURE shows a schematic structure view of an electrode assembly of an electrochemical device according to embodiments of the present application.

As shown in the FIGURE, in some embodiments of the present application, the present application provides an electrochemical device, including: a separator 10, a binding layer 20, an anode 30 and a cathode 40, wherein the separator 10 is disposed between the cathode 40 and the anode 30, and at least one binding layer 20 is included between the cathode 40 and the anode 30. The binding layer 20 includes a high molecular polymer, wherein a permittivity of the high molecular polymer is 5 F/m to 50 F/m.

In other embodiments, a permittivity of the high molecular polymer is approximately, for example, 5 F/m, 10 F/m, 15 F/m, 20 F/m, 25 F/m, 30 F/m, 35 F/m, 40 F/m, 45 F/m, 50 F/m or in a range formed by any two of the above values.

As shown in the FIGURE, in some embodiments, the cathode 40 includes a cathode current collector 401 and a cathode active material layer 402, and the anode 30 includes an anode current collector 301 and an anode active material layer 302.

It should be understood that although the binding layer 20 in the FIGURE is disposed between the anode active material layer 302 and the separator 10, this is only used to illustrate one implementation of the electrochemical device structure of the present application. Without departing from the spirit of the present application, those skilled in the art may dispose at least one binding layer 20 on a surface of at least one of the following according to specific demands: the cathode active material layer 402, the anode active material layer 302 and the separator 10, but is not limited thereto. For example, in some embodiments, the binding layer may be disposed between the cathode current collector and the cathode active material layer. In other embodiments, the binding layer may be disposed between the cathode active material layer and the separator. Similarly, the binding layer may also be disposed between the anode current collector and the anode active material layer or between the anode active material layer and the separator in the anode.

The term "layer" herein is used to describe a layered structure of various functional materials in an electrochemical device, for example, the binding layer, the anode active material layer, the cathode active material layer and the like. In some embodiments, the layered structure may be, but is not limited to, a layered structure which is continuous or discontinuous, has through holes or is composed of multiple particles. For example, a continuous layered structure is a complete layer, and there are no gaps in the layer; and a discontinuous layered structure contains multiple layers of scattered parts or segmented parts, and there are fracture surfaces or gaps between the various parts of the layers.

In other embodiments, the multi-layer binding layer may be arbitrarily disposed between the anode current collector, the anode active material layer, the separator, the cathode current collector and the cathode active material layer.

According to another aspect of the present application, embodiments of the present application provide a binding layer and adjust a molecular polarity of a high molecular polymer in the binding layer. The binding layer with strong molecular polarity may form good wettability on a surface in contact with an electrolytic solution, and by increasing a contact area with a bound surface, the binding effect is thereby enhanced. Due to good electrochemical stability, ethylene carbonate has good solubility with common lithium battery additives such as fluoroethylene carbonate (FEC) and is the most common solvent system for electrolytic solutions. Therefore, a contact angle of the high molecular polymer to ethylene carbonate in the binding layer may indicate the wettability of the binding layer to the electrolytic solution, and by controlling the contact angle of the high molecular polymer to ethylene carbonate, high binding force may be achieved to ensure the cycle performance and safety performance of its electrochemical device.

In some embodiments of the present application, the present application provides an electrochemical device, including: a cathode, an anode, a separator and a binding layer, wherein the separator is disposed between the cathode and the anode, at least one binding layer is included between the cathode and the anode, the binding layer includes a high molecular polymer, and a contact angle of the high molecular polymer to ethylene carbonate is 0° to 90°.

In other embodiments, the contact angle of the high molecular polymer to ethylene carbonate is approximately, for example, 0°, 10°, 20°, 30°, 40°, 50°, 60°, 70°, 80°, 90° or in a range formed by any two of the above values. In other embodiments, the contact angle of the high molecular polymer to ethylene carbonate is 10° to 50°.

In some embodiments, the above high molecular polymer is a modified polypropylene structure polymer, and the high molecular polymer includes a main chain and a substituent.

In some embodiments, the main chain of the high molecular polymer is formed of at least one of the following monomers: methyl propene, methacrylic acid, methyl methacrylate, imide, vinyl alcohol and ethylene glycol. In some embodiments, the main chain of the high molecular polymer is formed of at least one of the following monomers: methyl propene, imide, vinyl alcohol and ethylene glycol.

In some embodiments, the substituent of the high molecular polymer includes at least one of carboxyl, hydroxyl, amino, amido, methoxy, cyano and ester group. In some embodiments, the substituent of the high molecular polymer includes at least one of carboxyl, hydroxyl and amino In some embodiments, a degree of substitution of the substituent in the high molecular polymer is 0.2 to 0.8.

According to the embodiments of the present application, in one aspect, by selecting a high molecular polymer with a high-electronegativity substituent, the greater the electronegativity, the stronger the intermolecular force between the high molecular polymer and the bound interface material in the binding layer, and thereby enhancing the binding force of the binding layer. According to the embodiments of the present application, in another aspect, by selecting a high molecular polymer composed of a specific main chain structure and a specific substituent, the binding layer has good wetting capacity to the electrolytic solution, and thereby achieving strong binding.

In some embodiments, the binding force of the binding layer to the anode, the cathode or the separator may be at least greater than or equal to 10 N/m. In other embodiments, the binding force of the binding layer to the anode, the cathode or the separator is 15 N/m. In other embodiments, the binding force of the binding layer to the anode, the cathode or the separator is 20 N/m.

According to another aspect of the present application, the embodiments of the present application may effectively enhance the structural stability of the high molecular polymer in an alkaline solution by selecting the high molecular polymer with a specific substituent, so that the binding layer still maintains the binding force to the anode, the cathode and the separator after multiple charge and discharge cycles, and thereby enhancing the cycle life of its electrochemical device.

In the prior art, polyvinylidene fluoride (PVDF) is often used as a binder for the anode, the cathode or the separator. However, most binders have a problem of a decrease in binding force after multiple charge and discharge cycles. This is because that the halogen substituent fluorine in polyvinylidene fluoride has strong electron-withdrawing power, which in turn causes carbon atoms adjacent to the substituent fluorine to be susceptible to nucleophilic attack by the Lewis base (for example, $Li_2CO_3/Li_3Si_7/LiC_6$) in the electrolytic solution, the anode active material and the cathode active material, and thereby causing peeling of the substituent fluorine and finally causing a binding failure. The failure state of the binding force of the binder may be indicated by a weight loss rate of the high molecular polymer in the binder after an alkali resistance test. The higher the weight loss rate, the more severe the peeling of the substituent of the high molecular polymer in the binding layer, that is, the lower the binding force of the binding layer.

In some embodiments, the weight loss rate of the high molecular polymer after being immersed in a 1 mol/L sodium hydroxide solution for 0.5 hours is less than 20%. In other embodiments, the weight loss rate of the high molecular polymer after being immersed in a 1 mol/L sodium hydroxide solution for 0.5 hours is less than or equal to 10%.

In some embodiments, a number average molecular weight of the high molecular polymer is 1 kDa to 1000 kDa. In other embodiments, the number average molecular weight of the high molecular polymer is approximately, for example, 1 kDa, 10 kDa, 100 kDa, 200 kDa, 400 kDa, 600 kDa, 800 kDa, 1000 kDa or in a range formed by any two of the above values.

In some embodiments, the binding layer further includes inorganic particles, wherein the inorganic particles include at least one of $SrTiO_3$, $SnO_2$, $CeO_2$, MgO, NiO, CaO, ZnO, $ZrO_2$, $Y_2O_3$, $Al_2O_3$, $TiO_2$, $Al(OH)_3$, $Mg(OH)_2$ and SiC. By adding the inorganic particles to the binding layer, mechanical strength of the binding layer may be enhanced. When a temperature of the electrode assembly is too high or out of control during charge and discharge cycles, the binding layer with high mechanical strength may suppress safety accidents (for example, short circuits, cracks and the like) of the separator caused by thermal shrinkage.

In some embodiments, based on a total weight of the binding layer, a weight percentage of the inorganic particles is less than or equal to 50 wt %. In other embodiments, based on the total weight of the binding layer, the weight percentage of the inorganic particles is less than or equal to 30 wt %.

In some embodiments, a thickness of the binding layer is 0.5 μm to 5 μm. In other embodiments, the thickness of the binding layer is approximately, for example, 0.5 μm, 1 μm, 1.5 μm, 2 μm, 3 μm, 4 μm, 5 μm or in a range formed by any two of the above values.

In some embodiments, a porosity of the binding layer is 20% to 80%. In other embodiments, the porosity of the binding layer is approximately, for example, 20%, 30%, 40%, 50%, 60%, 70%, 80% or in a range formed by any two of the above values.

The thickness and porosity ranges of the binding layer in the embodiments of the present application may ensure the contact area of the bound interface to ensure a certain binding force, and will not cause the binding layer to block ion channels of the separator, the cathode or the anode, and thereby maintaining a certain ionic conductivity.

In some embodiments, the binding layer covers the anode active material layer, wherein a coverage rate of the binding layer on the anode active material layer is greater than or equal to 30%. In other embodiments, the coverage rate of the binding layer on the anode active material layer is greater than or equal to 60%.

In some embodiments, the binding layer covers the cathode active material layer, wherein a coverage rate of the binding layer on the cathode active material layer is greater than or equal to 30%. In other embodiments, the coverage rate of the binding layer on the cathode active material layer is greater than or equal to 60%.

The term "coverage rate" herein means a cover degree of the binding layer on the surface of the bound material. For example, a coverage rate of 100% means that the binding layer completely covers the entire area of the surface of the bound material. A coverage rate of 40% means that the binding layer covers only 40% area of the surface of the bound material, and the other 60% area of the surface of the bound material is in an exposed state.

In some embodiments, the electrochemical device is a lithium-ion battery.

Referring to the FIGURE, in some embodiments, the cathode 40 includes the cathode current collector 401, and the anode 30 includes the anode current collector 301. The cathode current collector 401 may be aluminum foil or nickel foil, and the anode current collector 301 may be copper foil or nickel foil. However, other cathode current collectors and anode current collectors commonly used in the art may be used without being limited thereto.

In some embodiments, the anode active material layer includes an anode active material capable of absorbing and releasing lithium (Li) (hereinafter, sometimes referred to as "an anode active material capable of absorbing/releasing lithium Li"). Examples of the anode active material capable of absorbing/releasing lithium (Li) may include carbon materials, metal compounds, oxides, sulfides, nitrides of lithium such as $LiN_3$, lithium metal, metals forming alloys together with lithium, and polymer materials. In some embodiments, the anode active material layer 302 includes at least one of artificial graphite, natural graphite, mesophase carbon microspheres, hard carbon, soft carbon, lithium titanate, monocrystalline silicon, amorphous silicon, a silicon-oxygen composite, a silicon-carbon composite or lithium metal.

In some embodiments, the cathode active material layer includes a cathode active material capable of absorbing and releasing lithium (Li) (hereinafter, sometimes referred to as "a cathode active material capable of absorbing/releasing lithium Li"). Examples of the cathode active material capable of absorbing and releasing lithium (Li) may include one or more of lithium cobalt oxide, lithium nickel cobalt manganese oxide, lithium nickel cobalt aluminum oxide, lithium manganate, lithium manganese iron phosphate, lithium vanadium phosphate, oxylithium vanadium phosphate, lithium iron phosphate, lithium titanate and lithium-rich manganese-based material.

In the above cathode active material, the chemical formula of the lithium cobalt oxide may be $Li_yCO_aM1_bO_{2-c}$, wherein M1 is at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and values of y, a, b and c are respectively within the following ranges: $0.8 \leq y \leq 1.2$, $0.8 \leq a \leq 1$, $0 \leq b \leq 0.2$, and $-0.1 \leq c \leq 0.2$;

In the above cathode active material, the chemical formula of the lithium nickel cobalt manganese oxide or lithium nickel cobalt aluminum oxide may be $Li_zNi_dM2_eO_{2-f}$, wherein M2 is at least one selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and values of z, d, e and f are respectively within the following ranges: $0.8 \leq z \leq 1.2$, $0.3 \leq d \leq 0.98$, $0.02 \leq e \leq 0.7$, and $-0.1 \leq f \leq 0.2$, In the above cathode active material, the chemical formula of the lithium manganate is $Li_uMn_{2-g}M3_gO_{4-h}$, wherein M3 is at least one selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and values of u, g and h are respectively within the following ranges: $0.8 \leq u \leq 1.2$, $0 \leq g \leq 1.0$, and $-0.2 \leq h \leq 0.2$.

In some embodiments, the cathode active material layer and the anode active material layer may each independently further include at least one of a binder and a conductive agent.

In some embodiments, the binder includes at least one of polyvinylidene fluoride, a vinylidene fluoride-hexafluoropropylene copolymer, polyamide, polyacrylonitrile, polyacrylate ester, polyacrylic acid, polyacrylate salt, carboxymethylcellulose sodium, polyvinylpyrrolidone, polyvinyl ether, polymethyl methacrylate, polytetrafluoroethylene, polyhexafluoropropylene or styrene-butadiene rubber. In some embodiments, the conductive agent includes at least one of carbon nanotubes, carbon fibers, conductive carbon black, acetylene black, graphene or Ketjen black. It should be understood that those skilled in the art may select the conventional binder and conductive agent in the art according to actual needs without being limited thereto.

In some embodiments, the separator includes, but is not limited to, at least one selected from polyethylene, polypropylene, polyethylene terephthalate, polyimide and aramid. For example, the polyethylene includes at least one component selected from high-density polyethylene, low-density polyethylene and ultra-high molecular weight polyethylene. In particular, the polyethylene and the polypropylene have a good function on preventing short circuits, and may improve the stability of the battery by a turn-off effect. In some embodiments, the separator is polypropylene, and the polypropylene has good affinity with the high molecular polymer in the above embodiments, which is beneficial to enhancing the binding force between the binding layer and the separator.

The lithium-ion battery of the present application further includes an electrolyte, the electrolyte may be one or more of a gel electrolyte, a solid electrolyte and an electrolytic solution, and the electrolytic solution includes a lithium salt and a non-aqueous solvent.

In some embodiments, the lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it may give a high ionic conductivity and improve the cycle performance.

The non-aqueous solvent may be a carbonate compound, a carboxylate compound, an ether compound, other organic solvent or a combination thereof.

The carbonate compound may be a chain carbonate compound, a cyclic carbonate compound, a fluorocarbonate compound or a combination thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate and combinations thereof.

In some embodiments, the non-aqueous solvent is selected from the group consisting of ethylene carbonate, propylene carbonate, diethyl carbonate, dimethyl carbonate, ethyl methyl carbonate, propylene carbonate, methyl acetate, ethyl propionate, fluoroethylene carbonate and combinations thereof.

It should be understood that without departing from the spirit of the present application, preparation methods of the cathode, the anode, the separator and the electrolyte in the embodiments of the present application may select any suitable conventional method in the art according to specific needs without being limited thereto.

In some embodiments, the preparation method of the lithium-ion battery of the present application includes the following steps: a multi-axis high-speed dispersion reactor is used, a high molecular polymer, an antioxidant (412S, Rianlon, Tianjin) and an emulsifier (N-dodecyl dimethylamine) are added according to a weight ratio of 99%:0.5%:0.5% into the reactor, a reaction temperature is controlled at 80° C. to 160° C., the reactor is vacuumized to −0.5 to −0.8 MPa, a reaction is performed for 4 hours, and filtration is carried out to obtain a high molecular polymer slurry. The high molecular polymer slurry is mixed with inorganic particles to form a binding layer slurry, a surface of a separator is coated with the binding layer slurry (or the surface of the separator may be directly coated with the binder slurry without being mixed with the inorganic particles), and drying is performed to obtain the separator with the binding layer on the surface. Subsequently, the cathode, the separator (with one surface coated with the binding layer facing the anode) and the anode in the above embodiments are sequentially arranged, wound, folded or stacked into an electrode assembly, the electrode assembly is placed into a packaging case, an electrolytic solution is injected, and subsequently, vacuum packaging, standing, formation, shaping and other procedures are performed to obtain the lithium-ion battery. It should be understood that those skilled in the art may adjust the above preparation method according to the disposition position of the binding layer, for example, but not limited to, coat the surface of the anode active material layer or the surface of the cathode active material layer with the binding layer slurry to form the binding layer disposed at different positions in the lithium-ion battery, for example, but not limited to, between the cathode active material layer and the cathode current collector, between the cathode active material layer and the separator, and the like.

Some embodiments of the present application further provide an electronic device, and the electronic device includes the electrochemical device in the embodiments of the present application.

The electronic device of the embodiments of the present application is not particularly limited, and may be any electronic device known in the art. In some embodiments, the electronic device may include, but is not limited to, a notebook computer, a pen input computer, a mobile computer, an e-book player, a portable phone, a portable fax machine, a portable copying machine, a portable printer, stereo headphones, a video recorder, a liquid crystal display television, a portable cleaner, a portable CD player, a mini disk player, a transceiver, an electronic notebook, a calculator, a memory card, a portable recorder, a radio, a backup power supply, a motor, a car, a motorcycle, an electric bicycle, a bicycle, a lighting fixture, a toy, a game console, a clock, an electric tool, a flash light, a camera, a large household storage battery, a lithium-ion capacitor and the like.

EXAMPLES

Some examples and comparative examples are enumerated below. The high molecular polymer in the binding layer is subjected to a permittivity test, a contact angle to ethylene carbonate test and an alkali resistance test, the anode and/or cathode and the separator are subjected to a binding force test, and the electrochemical device (lithium-ion battery) is subjected to a cycle swelling rate test, so as to better explain the technical solutions of the present application.

I. Test Methods 1.1 Preparation of High Molecular Polymer Sample:

The lithium-ion batteries of the following examples and comparative example were discharged at a constant current of 0.2 C to 3.0 V, and disassembled, and a separator attached with a binding layer was taken out. The separator attached with the binding layer was immersed in dimethyl carbonate, subjected to ultrasonic treatment for 5 minutes, dried at room temperature for 10 minutes, and immersed in 100 mL of extraction solution (prepared from chloroform, tetrahydrofuran and petroleum ether according to a volume ratio of 3:1:1) for 15 minutes after drying, a residue (separator substrate) was taken out, and the obtained extraction solution was subjected to rotary evaporation treatment at 105° C. in a vacuum to finally obtain a high molecular polymer sample.

The high molecular polymer sample was subjected to tablet-pressing (tablet press: ZP25, Xulang, Guangzhou, tablet-pressing pressure: 10 MPa, tablet-pressing diameter: 6 mm), an actual thickness h was measured with a 2 mm-diameter height gauge (GT2, Keyence), and an area S and a thickness d of the high molecular polymer sample were obtained.

1.2 Permittivity Test:

A permittivity tester (AS2855) was used to perform a permittivity test on the above high molecular polymer sample:

1) a permittivity tester was selected, the prepared high molecular polymer sample was put into a sample cell, and an inductance L=1H and a resistance R=1 kΩ were set;
2) a frequency of a signal source was adjusted such that a voltmeter reading reached the maximum, at this time, a loop resonated, and the frequency fat this time was recorded;
3) a capacitance C of the high molecular polymer sample was calculated and tested according to the formula $C=1/(4\pi^2 f^2 L)$; and
4) a permittivity was calculated according to the formula $\varepsilon_r=\varepsilon/\varepsilon_0=Cd/\varepsilon_0 S$. In the formula, $\varepsilon$ is the absolute permittivity, $\varepsilon_0$ is the vacuum permittivity and $\varepsilon_0=8.85\times 10^{-12}$ F/m, S is the effective area of the high molecular polymer sample, d is the thickness of the high molecular polymer sample, and C is the capacitance of the tested high molecular polymer sample.

1.3 Contact Angle Test:

In a room temperature environment (relative humidity is less than 50%), a surface of the above high molecular polymer sample was set to be horizontal, 0.3 μL of ethylene carbonate was added dropwise to form a drop-shape structure on the surface of the high molecular polymer sample, the high molecular polymer sample was allowed to stand for 0 5 minutes to 1 minute to a completely still state, and the contact angle of the high molecular polymer to ethylene carbonate was recorded by an optical microscope.

1.4 Alkali Resistance Test:

The above high molecular polymer sample was immersed in a 1M sodium hydroxide solution, and subjected to ultrasonic treatment for 30 minutes. Then filtration and drying were performed, masses before and after the alkaline solution immersion treatment were measured, and a weight loss rate was calculated. Weight loss rate of high molecular polymer=(1−weight of high molecular polymer sample after alkaline solution immersion treatment/weight of high molecular polymer sample before alkaline solution immersion treatment)×100%.

1.5 Binding Force Test:

The fresh lithium-ion batteries and the lithium-ion batteries after 500 cycles in the following examples were disassembled from an interface between the cathode and the separator (or an interface between the anode and the separator) in a dry room environment, and allowed to stand for 5 minutes until the electrolytic solution was evaporated to dry, a 150 mm×20 mm laminated structure of the anode (or cathode), the binding layer and the separator was cut off, and a Gotech tensile machine (AL-3000) (of which a tensile speed was set to 50 mm/min and a tensile displacement was set to 50 mm) was used to perform an interface peeling binding force test. In the following examples, 4 lithium-ion batteries were taken from each group, and an average of the binding force between the anode and the separator or between the cathode and the separator of the lithium-ion battery was calculated.

1.6 Cycle Swelling Rate Test:

A 600 g flat thickness gauge (ELASTOCON, EV 01) was used to test the thickness of the lithium-ion battery. The lithium-ion battery of the following examples and comparative example was placed in a thermostat at 45° C.±2° C. and allowed to stand for 2 hours, charged at a constant current of 1.5 C to 4.25 V, and then charged at a constant voltage of 4.25 V to 0.02 C and allowed to stand for 15 minutes; the lithium-ion battery was then discharged at a constant current of 4.0 C to 2.8 V, which was one charge and discharge cycle, and the thickness of the lithium-ion battery in the fully charged state at the first cycle was recorded; and the charge and discharge cycle was repeated 500 times according to the above method, and the thickness of the lithium-ion battery in the fully charged state at every cycle was recorded.

4 lithium-ion batteries were tested for each group, and an average of the cycle thickness swelling rate of the lithium-ion batteries was calculated. Cycle thickness swelling rate of lithium-ion battery=(thickness of lithium-ion battery after 500 cycles/thickness of fresh lithium-ion battery−1)×100%.

II. Preparation Methods

2.1 Preparation of Cathode

Lithium cobalt oxide, conductive carbon black, carbon nanotubes and polyvinylidene fluoride were dissolved according to a weight ratio of 96:0.5:0.5:3 in an N-methylpyrrolidone solution to form a cathode slurry. By using aluminum foil as a cathode current collector, the cathode current collector was coated with the cathode slurry, and drying, cold pressing and cutting procedures were performed to obtain the cathode.

2.2 Preparation of Anode

A silicon-carbon composite, styrene-butadiene rubber and carboxymethylcellulose sodium were dissolved according to a weight ratio of 97.7:1.0:1.3 in deionized water to form an anode slurry. By using copper foil as an anode current collector, the anode current collector was coated with the anode slurry, and drying, cold pressing and cutting procedures were performed to obtain the anode.

2.3 Preparation of Electrolytic Solution

In an environment with a water content of less than 10 ppm, lithium hexafluorophosphate and a non-aqueous organic solvent (ethylene carbonate (EC):diethyl carbonate (DEC):propylene carbonate (PC):propyl propionate (PP): vinylene carbonate (VC)=20:30:20:28:2, weight ratio) were mixed according to a weight ratio of 8:92 to form the electrolytic solution.

2.4 Preparation of Lithium-Ion Battery

By using polyethylene as a separator, the anode and the cathode above, a binding layer attached to the separator in the following examples, and the separator were sequentially stacked (such that the separator was between the cathode and the anode to perform a separation function), and then wound into an electrode assembly. Subsequently, the electrode assembly was placed in an aluminum-plastic film packaging bag, and dehydrated at 80° C. to obtain a dry electrode assembly. Subsequently, the above electrolytic solution was injected into the dry electrode assembly, and vacuum packaging, standing, formation, shaping and other procedures were performed, and thereby completing the preparation of the lithium-ion batteries of the following examples and comparative example.

Comparative Example 1

Polyvinylidene fluoride powder, dodecyl dimethylamine (emulsifier) and water were mixed according to a weight ratio of 9.5:0.5:90 at room temperature for 1 hour, and allowed to stand for 3 hours to obtain a polyvinylidene fluoride aqueous emulsion. The polyvinylidene fluoride aqueous emulsion and dimethylacetamide were mixed according to a weight ratio of 2:1 to form a binding layer coating. By using polyethylene as a separator, one side surface of the separator was coated with the binding layer coating, and drying was performed to obtain a separator with the binding layer on one surface.

Subsequently, the above cathode, the separator with the binding layer on one surface, and the above anode were sequentially arranged such that the separator was between the cathode and the anode to perform a separation function and the binding layer was between the separator and the anode to perform a binding function, wherein a coverage rate of the binding layer on the anode surface (equivalent to the anode active material layer) was 90%-100%, and an electrode assembly was obtained by winding. Subsequently, the electrode assembly was placed in an aluminum-plastic film packaging bag, and dehydrated at 80° C. to obtain a dry electrode assembly. Subsequently, the above electrolytic solution was injected into the dry electrode assembly, and vacuum packaging, standing, formation, shaping and other procedures were performed, and thereby completing the preparation of the lithium-ion battery.

Example 1

The preparation manner was the same as that in Comparative Example 1, except that: in Example 1, the polyvinylidene fluoride aqueous emulsion was replaced by a high molecular polymer aqueous emulsion formed of a high molecular polymer of which a main chain monomeric unit was methyl propene, a substituent was carboxyl, a degree of substitution was 0.65 and a number average molecular weight was 30000 Da. For the specific type of the high molecular polymer, reference may be made to Table 1. The coverage rate of the binding layer on the anode active material layer of the anode was 90%.

Examples 2-6

The preparation manner was the same as that in Example 1, except that: in Examples 2-6, the main chain monomeric unit of the high molecular polymer was respectively methacrylic acid, methyl methacrylate, imide, ethylene glycol and vinyl alcohol.

Example 7

The preparation manner was the same as that in Example 1, except that: in Example 7, the main chain monomeric unit of the high molecular polymer was propylene, and the substituent was hydroxyl.

Examples 8-10

The preparation manner was the same as that in Example 7, except that: in Examples 8-10, the substituent of the high molecular polymer was respectively amino, amido and methoxy.

Examples 11 and 12

The preparation manner was the same as that in Example 7, except that: in Examples 11 and 12, the substituent of the high molecular polymer was carboxyl, and the degree of substitution was sequentially 0.25 and 0.75.

Examples 13 and 14

The preparation manner was the same as that in Example 7, except that: in Examples 13 and 14, the number average molecular weight of the high molecular polymer was sequentially 1500 Da and 100000 Da, and the substituent was carboxyl.

Examples 15 and 16

The preparation manner was the same as that in Example 7, except that: in Examples 15 and 16, the coverage rate of the binding layer to a first surface of the anode was respectively 96% and 30%, and the substituent of the high molecular polymer was carboxyl.

Examples 17-19

The preparation manner was the same as that in Example 7, except that: in Examples 17-19, the silicon-carbon composite during the preparation of the anode was sequentially replaced by a silicon-oxygen composite, graphite and hard carbon, and the substituent of the high molecular polymer was carboxyl.

Examples 20-21

The preparation manner was the same as that in Example 1, except that: in Examples 20-21, the binding layer coating was sequentially and respectively coated on the anode active material layer and the cathode active material layer, instead of the separator, and then the lithium-ion battery was assembled, wherein the coverage rate of the binding layer on the surface of the anode active material layer and the surface of the cathode active material layer was 90%.

Examples 22-23

The preparation manner was the same as that of Example 1, except that: in Examples 22-23, a coating thickness of the binding layer was sequentially 1.5 μm and 5 μm.

Examples 24-26

The preparation manner was the same as that of Example 1, except that: in Examples 24-26, a porosity of the binding layer was sequentially 20%, 60% and 80%.

The binding layers and materials thereof of the above examples and comparative example were subjected to the permittivity test, the contact angle to ethylene carbonate test and the alkali resistance test, and the thickness, width, length and weight were measured. Subsequently, the lithium-ion batteries were subjected to the binding force test and the cycle swelling rate test, and the test results were recorded.

Statistical values of the binding layers and the high molecular polymers thereof in Examples 1-26 and Comparative Example 1 are shown in Table 1 below.

TABLE 1

| Example/ Comparative Example | High Molecular Polymer Monomer | Substituent of High Molecular Polymer | Degree of Substitution of High Molecular Polymer | Number Average Molecular Weight of High Molecular Polymer (Da) | Thickness of Binding Layer (μm) | Porosity of Binding Layer | Coverage rate of Binding Layer | Anode Active Material |
|---|---|---|---|---|---|---|---|---|
| Example 1 | Methyl propene | Carboxyl | 0.65 | 30000 | 3 | 40% | 90% | Silicon-carbon composite |
| Example 2 | Methacrylic acid | Carboxyl | 0.65 | 30000 | 3 | 40% | 90% | Silicon-carbon composite |
| Example 3 | Methyl methacrylate | Carboxyl | 0.65 | 30000 | 3 | 40% | 90% | Silicon-carbon composite |
| Example 4 | Imide | Carboxyl | 0.65 | 30000 | 3 | 40% | 90% | Silicon-carbon composite |
| Example 5 | Ethylene glycol | Carboxyl | 0.65 | 30000 | 3 | 40% | 90% | Silicon-carbon composite |
| Example 6 | Vinyl alcohol | Carboxyl | 0.65 | 30000 | 3 | 40% | 90% | Silicon-carbon composite |
| Example 7 | Propylene | Hydroxyl | 0.65 | 30000 | 3 | 40% | 90% | Silicon-carbon composite |
| Example 8 | Propylene | Amino | 0.65 | 30000 | 3 | 40% | 90% | Silicon-carbon composite |
| Example 9 | Propylene | Amido | 0.65 | 30000 | 3 | 40% | 90% | Silicon-carbon composite |
| Example 10 | Propylene | Methoxy | 0.65 | 30000 | 3 | 40% | 90% | Silicon-carbon composite |
| Example 11 | Propylene | Carboxyl | 0.25 | 30000 | 3 | 40% | 90% | Silicon-carbon composite |
| Example 12 | Propylene | Carboxyl | 0.75 | 30000 | 3 | 40% | 90% | Silicon-carbon composite |

TABLE 1-continued

| Example/Comparative Example | High Molecular Polymer Monomer | Substituent of High Molecular Polymer | Degree of Substitution of High Molecular Polymer | Number Average Molecular Weight of High Molecular Polymer (Da) | Thickness of Binding Layer (μm) | Porosity of Binding Layer | Coverage rate of Binding Layer | Anode Active Material |
|---|---|---|---|---|---|---|---|---|
| Example 13 | Propylene | Carboxyl | 0.65 | 1500 | 3 | 40% | 90% | Silicon-carbon composite |
| Example 14 | Propylene | Carboxyl | 0.65 | 100000 | 3 | 40% | 90% | Silicon-carbon composite |
| Example 15 | Propylene | Carboxyl | 0.65 | 30000 | 3 | 40% | 96% | Silicon-carbon composite |
| Example 16 | Propylene | Carboxyl | 0.65 | 30000 | 3 | 40% | 30% | Silicon-carbon composite |
| Example 17 | Propylene | Carboxyl | 0.65 | 30000 | 3 | 40% | 90% | Silicon-oxygen composite |
| Example 18 | Propylene | Carboxyl | 0.65 | 30000 | 3 | 40% | 90% | Graphite |
| Example 19 | Propylene | Carboxyl | 0.65 | 30000 | 3 | 40% | 90% | Hard carbon |
| Example 20 | Methyl propene | Carboxyl | 0.65 | 30000 | 3 | 40% | 90% | Silicon-carbon composite |
| Example 21 | Methyl propene | Carboxyl | 0.65 | 30000 | 3 | 40% | 90% | Silicon-carbon composite |
| Example 22 | Methyl propene | Carboxyl | 0.65 | 30000 | 1.5 | 40% | 90% | Silicon-carbon composite |
| Example 23 | Methyl propene | Carboxyl | 0.65 | 30000 | 5 | 40% | 90% | Silicon-carbon composite |
| Example 24 | Methyl propene | Carboxyl | 0.65 | 30000 | 3 | 20% | 90% | Silicon-carbon composite |
| Example 25 | Methyl propene | Carboxyl | 0.65 | 30000 | 3 | 60% | 90% | Silicon-carbon composite |
| Example 26 | Methyl propene | Carboxyl | 0.65 | 30000 | 3 | 80% | 90% | Silicon-carbon composite |
| Comparative Example 1 | Polyvinylidene fluoride | Fluoro | 0.65 | 30000 | 3 | 40% | 90% | Silicon-carbon composite |

The results of the permittivity test, the contact angle to ethylene carbonate test and the alkali resistance test of the binding layers of Examples 1-26 and Comparative Example 1, and the results of the binding force test and the cycle swelling rate test of the lithium-ion batteries are shown in Table 2 below.

TABLE 2

| Example/Comparative Example | Permittivity (F/m) | Contact Angle to Ethylene Carbonate (°) | Weight Loss Rate | Binding Force of Fresh Binding Layer (N/m) | Binding Force of Binding Layer after 500 Cycles (N/m) | Cycle Thickness Swelling Rate |
|---|---|---|---|---|---|---|
| Example 1 | 27.9 | 45 | 7% | 19 | 16 | 5% |
| Example 2 | 14.7 | 72 | 8% | 16 | 13 | 6% |
| Example 3 | 15.6 | 69 | 9% | 16 | 13 | 6% |
| Example 4 | 33.8 | 33 | 7% | 20 | 17 | 5% |
| Example 5 | 36.5 | 27 | 7% | 20 | 17 | 5% |
| Example 6 | 42.3 | 16 | 5% | 22 | 19 | 5% |
| Example 7 | 43.3 | 14 | 7% | 22 | 19 | 5% |
| Example 8 | 43.4 | 13 | 6% | 22 | 19 | 5% |
| Example 9 | 12.0 | 76 | 8% | 15 | 12 | 6% |
| Example 10 | 11.9 | 77 | 9% | 15 | 12 | 6% |
| Example 11 | 5.9 | 85 | 9% | 14 | 11 | 6% |
| Example 12 | 49.6 | 11 | 4% | 23 | 20 | 5% |
| Example 13 | 7.7 | 86 | 10% | 14 | 11 | 6% |
| Example 14 | 49.3 | 12 | 5% | 23 | 20 | 5% |
| Example 15 | 5.9 | 85 | 10% | 15 | 12 | 5% |
| Example 16 | 5.9 | 85 | 6% | 13 | 10 | 6% |
| Example 17 | 49.5 | 11 | 5% | 16 | 13 | 6% |
| Example 18 | 49.5 | 11 | 5% | 20 | 17 | 5% |
| Example 19 | 49.5 | 11 | 5% | 17 | 14 | 6% |
| Example 20 | 27.9 | 45 | 7% | 20 | 17 | 4% |
| Example 21 | 27.9 | 45 | 7% | 12 | 11 | 6% |
| Example 22 | 49.5 | 11 | 5% | 16 | 13 | 7% |
| Example 23 | 49.5 | 11 | 5% | 25 | 22 | 3% |
| Example 24 | 49.5 | 11 | 5% | 18 | 15 | 6% |

TABLE 2-continued

| Example/ Comparative Example | Permittivity (F/m) | Contact Angle to Ethylene Carbonate (°) | Weight Loss Rate | Binding Force of Fresh Binding Layer (N/m) | Binding Force of Binding Layer after 500 Cycles (N/m) | Cycle Thickness Swelling Rate |
|---|---|---|---|---|---|---|
| Example 25 | 49.5 | 11 | 5% | 32 | 29 | 4% |
| Example 26 | 49.5 | 11 | 5% | 44 | 42 | 4% |
| Comparative Example 1 | 3.2 | 106 | 48% | 8 | 3 | 23% |

As shown in Table 1 and Table 2, according to the examples of the present application, by adjusting the monomer and substituent of the high molecular polymer, the degree of substitution of the substituent, the number average molecular weight and the coverage rate of the binding layer, the permittivity of the high molecular polymer, the contact angle of the high molecular polymer to ethylene carbonate and the weight loss rate of the high molecular polymer through the alkali resistance test may be effectively controlled. By comparing Examples 1-26 and Comparative Example 1, it may be seen that the binding layer within the range of the permittivity of the high molecular polymer of the present application or within the range of the contact angle of the high molecular polymer to ethylene carbonate may effectively enhance the binding force between the anode and the separator, and may greatly suppress the cycle swelling rate of the lithium-ion battery, and thereby enhancing the cycle performance of the lithium-ion battery.

By comparing Examples 11 and 12, it may be seen that the higher the degree of substitution of the high molecular polymer in the binding layer of the present application, the higher the electronegativity and polarity of the molecules, so that the permittivity of the high molecular polymer will also increase, and thereby enhancing the material viscosity of the binding layer. In addition, the contact angle of the high molecular polymer to ethylene carbonate will decrease, so that the wetting capacity of the binding layer to the electrolytic solution will increase, and thereby enhancing the binding force between the anode and the separator.

By comparing Examples 13 and 14, it may be seen that the higher the number average molecular weight of the high molecular polymer in the binding layer of the present application, the higher the permittivity of the high molecular polymer, and thereby enhancing the material viscosity of the binding layer. In addition, the contact angle of the high molecular polymer to ethylene carbonate will decrease, and thereby enhancing the binding force of the binding layer between the anode and the separator.

By comparing Examples 7, 15 and 16, it may be seen that the higher the coverage rate of the binding layer on the bound layer (for example, the anode active material layer), the higher the binding force of the binding layer. By comparing Examples 17-19, it may be seen that the binding force of the binding layer of the present application to different anode active material layers may still maintain certain strength (greater than 17 N/m for fresh lithium-ion batteries, and greater than 14 N/m for lithium-ion batteries after 500 cycles). By comparing Examples 1, 20 and 21, it may be seen that the electrochemical cell including the binding layer of the present application may effectively enhance the structural stability of the electrochemical device and effectively reduce the cycle thickness swelling rate regardless of whether the binding layer is positioned on the cathode active material layer or the anode active material layer.

By comparing Examples 1, 22 and 23, it may be seen that the higher the coating thickness of the binding layer, the higher the binding force of the binding layer. By comparing Examples 1 and 24-26, it may be seen that the higher the porosity of the binding layer of the present application, the higher the binding force between the anode and the separator.

By comparing the above examples and comparative example, it may be clearly understood that by providing the binding layer between the anode and the separator, the electrochemical device of the present application may maintain sufficient structural stability during cycles even if an anode active material with high energy density is used. At the same time, by defining the permittivity, the contact angle to ethylene carbonate and the weight loss rate through the alkali resistance test of the high molecular polymer in the binding layer, the present application may further ensure the binding force of the binding layer between the anode and the separator, so that the safety performance and cycle performance of the electrochemical device may be significantly enhanced.

References throughout the specification to "some embodiments," "partial embodiments," "one embodiment," "another example," "examples," "specific examples" or "partial examples" mean that at least one embodiment or example of the present application includes specific features, structures, materials or characteristics described in the embodiment or example. Therefore, descriptions appearing throughout the specification, for example, "in some embodiments," "in the embodiments," "in an embodiment," "in another example," "in an example," "in a specific example" or "examples," are not necessarily referring to the same embodiment or example in the present application. In addition, the specific features, structures, materials or characteristics herein may be combined in any suitable manner in one or more embodiments or examples.

Although illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:
1. An electrochemical device, comprising:
a cathode;
an anode;
a separator, the separator being disposed between the cathode and the anode; and
a binding layer disposed between the cathode and the anode;

wherein, the binding layer comprising a polymer, wherein a contact angle of the polymer to ethylene carbonate is 0° to 90°, a weight loss rate of the polymer after being immersed in a 1 mol/L sodium hydroxide solution for 0.5 hours is less than 20%, a number average molecular weight of the polymer is 1 kDa to 100 kDa, and a degree of substitution of the substituent in the polymer is 0.2 to 0.8.

2. The electrochemical device according to claim 1, wherein the cathode comprises a cathode active material layer, the anode comprises an anode active material layer, and the binding layer is disposed on a surface of at least one selected from the group consisting of the cathode active material layer, the anode active material layer and the separator.

3. The electrochemical device according to claim 2, wherein the binding layer covers the anode active material layer, and a coverage rate of the binding layer on the anode active material layer is greater than or equal to 30%.

4. The electrochemical device according to claim 1, wherein the polymer comprises a main chain and a substituent, and the main chain is formed of at least one monomers selected from the group consisting of methyl propene, methacrylic acid, methyl methacrylate, imide, vinyl alcohol and ethylene glycol; the substituent is at least one selected from the group consisting of carboxyl, hydroxyl, amino, amido, methoxy, cyano and ester group.

5. The electrochemical device according to claim 1, wherein the binding layer further comprises inorganic particles, and based on a total weight of the binding layer, a weight percentage of the inorganic particles is less than or equal to 50 wt ¾.

6. The electrochemical device according to claim 1, wherein a thickness of the binding layer is 0.5 μm to 5 μm, and a porosity of the binding layer is 20% to 80%.

7. The electrochemical device according to claim 1, wherein the anode active material layer comprises at least one of graphite, mesophase carbon microspheres, hard carbon, soft carbon, lithium titanate, monocrystalline silicon, amorphous silicon, a silicon-oxygen composite, a silicon-carbon composite or lithium metal.

8. An electronic device, comprising an electrochemical device, the electrochemical device comprising:
 a cathode;
 an anode;
 a separator, the separator being disposed between the cathode and the anode;
 and a binding layer disposed between the cathode and the anode;
 wherein, the binding layer comprising a polymer, wherein a contact angle of the polymer to ethylene carbonate is 0° to 90°,
 a weight loss rate of the polymer after being immersed in a 1 mol/L sodium hydroxide solution for 0.5 hours is less than 20%,
 a number average molecular weight of the polymer is 1 kDa to 100 kDa, and
 a degree of substitution of the substituent in the polymer is 0.2 to 0.8.

9. The electronic device according to claim 8, wherein the cathode comprises a cathode active material layer, the anode comprises an anode active material layer, and the binding layer is disposed on a surface of at least one selected from the group consisting of the cathode active material layer, the anode active material layer and the separator.

10. The electronic device according to claim 9, wherein the binding layer covers the anode active material layer, and a coverage rate of the binding layer on the anode active material layer is greater than or equal to 30%.

11. The electronic device according to claim 8, wherein the polymer comprises a main chain and a substituent, and the main chain is formed of at least one monomers selected from the group consisting of methyl propene, methacrylic acid, methyl methacrylate, imide, vinyl alcohol and ethylene glycol; the substituent is at least one selected from the group consisting of carboxyl, hydroxyl, amino, amido, methoxy, cyano and ester group.

12. The electronic device according to claim 8, wherein the binding layer further comprises inorganic particles, and based on a total weight of the binding layer, a weight percentage of the inorganic particles is less than or equal to 50 wt ¾.

13. The electronic device according to claim 8, wherein a thickness of the binding layer is 0.5 μm to 5 μm, and a porosity of the binding layer is 20% to 80%.

14. The electronic device according to claim 8, wherein the anode active material layer comprises at least one of graphite, mesophase carbon microspheres, hard carbon, soft carbon, lithium titanate, monocrystalline silicon, amorphous silicon, a silicon-oxygen composite, a silicon-carbon composite or lithium metal.

* * * * *